United States Patent [19]

Bush

[11] 4,259,821

[45] Apr. 7, 1981

[54] LIGHTWEIGHT STRUCTURAL COLUMNS

[75] Inventor: Harold G. Bush, Yorktown, Va.

[73] Assignee: The United States of America as represented by the Administrator of the National Aeronautics and Space Administration, Washington, D.C.

[21] Appl. No.: 811,401

[22] Filed: Jun. 29, 1977

[51] Int. Cl.³ .............................................. E04C 3/29
[52] U.S. Cl. ..................... 52/309.1; 52/648; 52/726; 244/158 R; 403/171; 428/902
[58] Field of Search ............... 52/DIG. 10, 80, 81, 52/648, 148, 114, 649; 403/171, 176, 172; 428/902; 285/DIG. 12, 423, 319

[56] References Cited

U.S. PATENT DOCUMENTS

| | | | |
|---|---|---|---|
| 147,498 | 2/1874 | Henderson | 285/319 X |
| 177,686 | 5/1876 | Buzzell | 285/319 X |
| 1,224,611 | 5/1917 | Currier | 285/319 X |
| 1,420,669 | 6/1922 | Schutte | 403/176 |
| 2,369,533 | 2/1945 | Cohen | 52/726 |
| 2,410,246 | 10/1946 | Scrivener | 52/726 |
| 2,410,799 | 6/1946 | Riemenschneider | 52/148 |
| 3,100,555 | 8/1963 | Ashton | 52/655 |
| 3,394,954 | 7/1968 | Sarns | 285/423 |
| 3,563,580 | 2/1971 | Black | 52/648 |
| 3,665,670 | 5/1972 | Rummler | 52/655 |
| 3,719,538 | 3/1973 | Carlson | 428/902 |
| 4,020,202 | 4/1977 | Kreft | 428/902 |

Primary Examiner—John E. Murtagh
Attorney, Agent, or Firm—Wallace J. Nelson; John R. Manning; Howard J. Osborn

[57] ABSTRACT

Lightweight half-lengths of columns for truss structures that are adapted for nestable storage and transport to facilitate fabrication of large area truss structures at a remote site and particularly adaptable for space applications.

8 Claims, 6 Drawing Figures

LIGHTWEIGHT STRUCTURAL COLUMNS

ORIGIN OF THE INVENTION

The invention described herein was made by an employee of the U.S. government and may be manufactured and used by or for the Government for governmental purposes without the payment of any royalties thereon or therefor.

BACKGROUND OF THE INVENTION

The Space Shuttle Transportation System being developed by the National Aeronautics and Space Administration for the 1980's will provide man new opportunities for exploitation of space. The capability to economically place large payloads in orbit offers the chance to perform space missions that previously were impractical. Projects presently under consideration include such items as extremely large antenna for communications or earth surveillance, space based manufacturing facilities and solar power stations for converting and transmitting collected solar energy to earth. These missions are characterized by structures which have large areas even by earth standards. The prospect of orbiting such structures provides unparalleled challenges for developing extremely efficient structural concepts. The success of these missions will also depend on the success of the structural designer in developing new and unique ways to fabricate and assemble large structures.

Although the Space Shuttle represents an improvement in orbital payload capability, it is also limited to an anticipated payload of sixty-five thousand pounds and a cargo bay fifteen feet in diameter and sixty feet in length. Realistically, any mission involving large structures or technology development in space in the near future must be accomplished via Space Shuttle. It is therefore advantageous to develop efficient structural concepts to minimize the total mass which must be orbited and for maximum utilization of the cargo bay area to permit weight critical payloads for Space Shuttle to be achieved and minimize the total number of flights required.

One space structure that has been considered appropriate for such missions is a three-dimensional truss network which may be in the kilometer size in two directions. Such a structural grid system would be an assemblage of highly efficient compression members such as cylinders or truss columns. These compression members must also be compatible with the Shuttle packaging constraints.

It is therefore an object of the present invention to provide a new and novel structural column having a high packing density that provides maximum utilization of the Space Shuttle payload area.

Another object of the present invention is a novel lightweight truss structure that may be assembled with a minimum of effort and in a weightless environment.

A further object of the present invention is to provide half-length structural columns that may be packaged and transported in a nested relationship and wherein any two half-lengths are connectible to form a column in a truss structure.

An additional object of the present invention is to provide novel lock-joint end fittings on half-length structural column bodies that permit easy attachment of any two half-length bodies.

Another object of the present invention is to provide a novel low density composite structural column tapering from a large end to a smaller end of essentially one-half the diameter of the large end.

Another object of the present invention is a novel attachment fitting for a structural column to facilitate attachment of adjacent structural columns into a unitary body with a minimum of effort.

BRIEF SUMMARY OF THE INVENTION

According to the present invention, the foregoing and other objects are attained by forming an elongated hollow tapered structural column from a composite such for example a graphite/epoxy material, and assembling these columns into a unitary truss structure at a remote spatial site, or the like. The structural columns of the assembled truss structure are formed from two half-length segments that are provided with a fitting at an enlarged end thereof that is adapted to engage and lock with an identical fitting on another half-length segment. Each half-length segment tapers from an enlarged end to a smaller opposite end and a second fitting is provided secured to this smaller end.

This second fitting is provided with an extension thereon serving as an attachment structure to engage a cluster joint bracket that connects to other columns in the truss structure.

DETAILED DESCRIPTION

A more complete appreciation of the invention and many of the attendant advantages thereof will be more clearly understood as the same becomes better understood by reference to the following detailed description when considered in connection with the accompanying drawings wherein.

Figure 1:
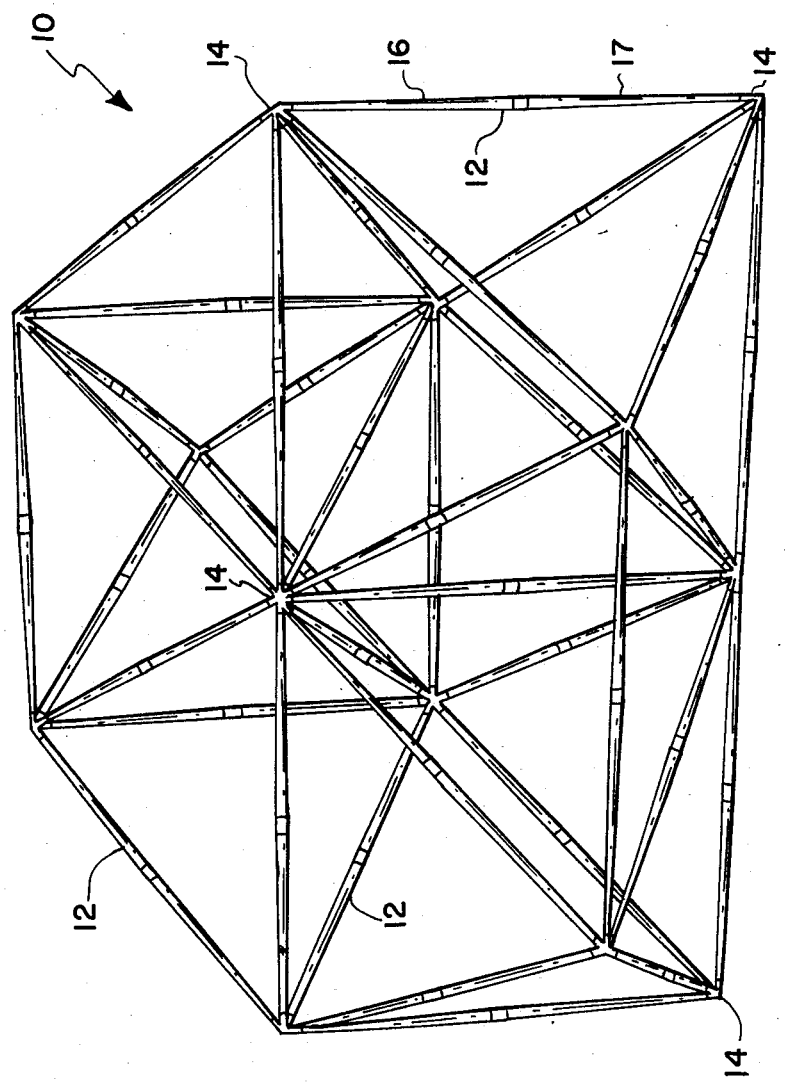
FIG. 1 is a view of an exemplary truss structure according to the present invention.
Figure 2:
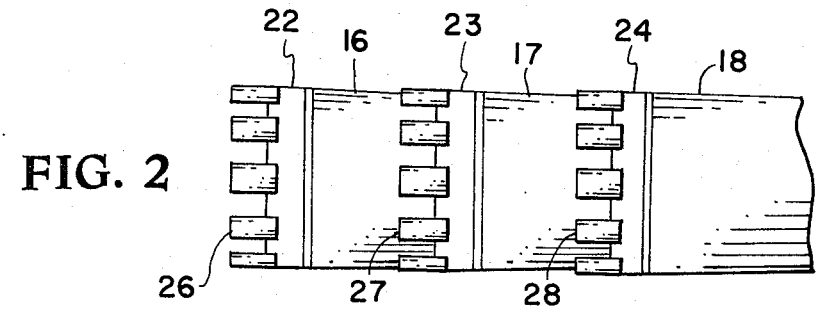
FIG. 2 is a view of several half-length column segments of the present invention shown in nested packaged relationship for transporting.

Referring now to the drawings wherein like reference numerals designate identical parts throughout the several views, and more particularly to FIG. 1, there is shown a truss structure constructed in accordance with the present invention and designated by reference numeral 10. Truss structure 10 is constructed from a plurality of identical elongated structural columns 12 connected to a plurality of rigid cluster brackets 14, by individual bifurcated end fittings 15, as will be further explained hereinafter. Structural columns 12 have enlarged central areas that taper to smaller opposite ends and are formed of two identical half-length segments as designated by reference numerals 16, 17, 18. As shown more particularly in FIG. 2, the tapered configuration for columns 16, 17 and 18 permits nested packaging thereof to minimize package area and to facilitate stowage and transportation from a manufacturing to an assembly site, as will be further explained hereinafter. A lock type end fitting is provided at the enlarged end of each half-length 16, 17 and 18 (and the others, not designated) as designated by reference numerals 22, 23 and 24. Each of these fittings is provided with a plurality of fingers disposed in spaced relationship along the periphery thereof and one of which is designated in each fitting 22, 23 and 24, respectively, by reference numerals 26, 27 and 28.

Figure 5:
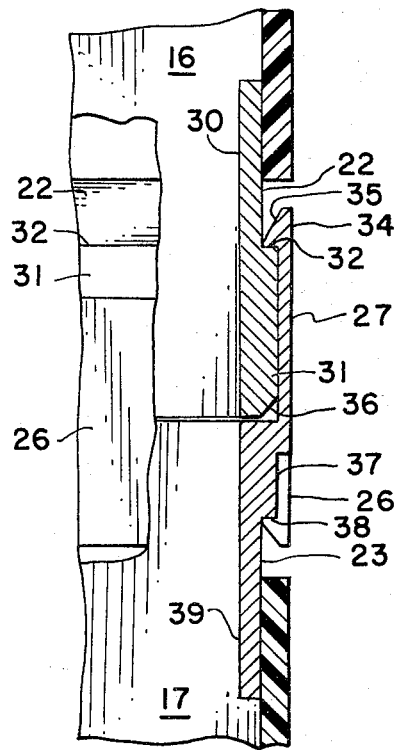
FIG. 5 is a sectional view of the column fittings taken along line 5—5 of FIG. 3.

As shown more particularly in FIG. 5, end fitting 22 for half-length 16 is composed of a first length portion 30 slidably received and adhesively bonded within the enlarged end of the hollow half-length structural member 16, a second or intermediate length portion 31 integral with portion 30 and extending from the enlarged open end of member 16 and a plurality of spaced fingers (one of which is designated by reference numeral 24) integral with and extending from intermediate portion 31. An annular shoulder 32 is formed on intermediate length portion 31 exteriorly along the circumference of the enlarged open end of half-length 16. Shoulder 31 serves to receive the individual tab or ear protrusions formed on the individual fingers when two half-lengths are in locked engagement. One such tab 34 is shown on finger 27 of fitting 23. The inward face of tab 34 is provided with a machined tapered surface 35 to engage an opposite taper or beveled edge 36 formed on the intermediate length portion in the spacing between the individual fingers to assist in springing the individual fingers onto the shoulder of the half-length being connected to permit locking contact therewith. The intermediate portion of fitting 23 secured to half-length member 17 is designated by reference numeral 37, the annular shoulder thereon by reference numeral 38 and the slidable portion extending into half-length 17, by reference numeral 39.

Figure 4:
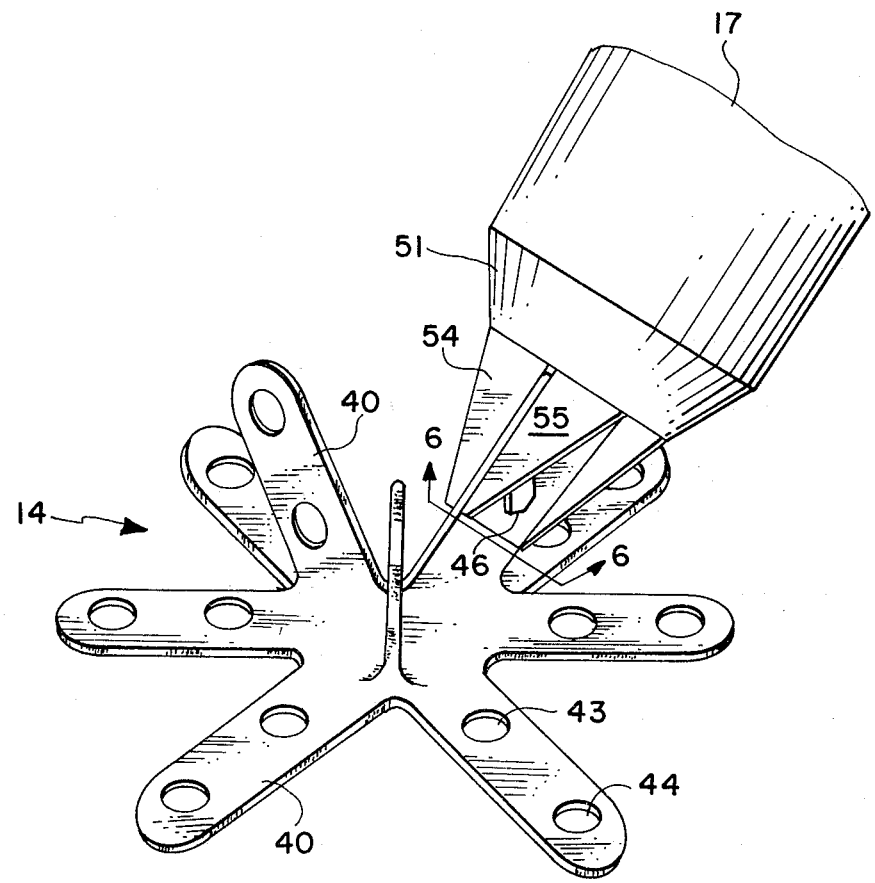
FIG. 4 is an enlarged view of a cluster joint or bracket member for use in connecting a plurality of structural columns in the truss structure shown in FIG. 1.
Figure 6:
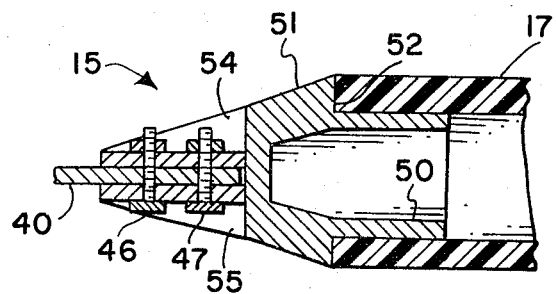
FIG. 6 is a sectional view of a column end fitting attached to a cluster joint in a truss assembly and taken along line 6—6 of FIG. 4.

Referring now more particularly to FIGS. 4 and 6 the details for end fittings 15 and cluster connectors 14 will now be described. As shown therein, cluster brackets 14 are formed of a plurality of integral identical arms or branches designated by reference numeral 40 and angular disposed in the desired relationship for the assembled truss structure 10. Each arm 40 is provided with at least two holes 43, 44 therethrough. To secure a column 12 to a cluster bracket connector 14, the bifurcated end fitting 15 is slidably positioned onto the appropriate arm 40 and the openings in the bifurcated tip alined with openings 43 and 44 and suitable connecting fasteners 46 and 47 positioned therein in a conventional manner.

Fitting 15 is formed of a lightweight metal such for example aluminum, titanium or the like and includes a first annular sleeve portion 50 slidably received and bonded within the small end of each half-length 17 (FIG. 6), an intermediate solid portion 51 having a frustoconical exterior configuration tapering away from the end of half-length 17 and an annular shoulder 52 formed on frustoconical portion 51. Shoulder 52 is of essentially the same width as the thickness of half-length 17 and serves to abut against and be bonded to the small open end thereof. A bifurcated tip extends from frustoconical portion 51 with each bifurcation 54, 55 being shaped as an essentially open triangular box configuration with a pair of openings provided through each bifurcation to aline with openings 43 and 44 in arms 40 of brackets 15 and receive the lock connectors 46 and 47 therethrough.

In a specific embodiment of the present invention half-lengths 16, 17 etc., were formed of a graphite/epoxy composite prepreg tape formed about a mandrel and cured according to the manufacturer's specifications. The term "prepreg" is a term of art denoting preimpregnated unidirectional continuous filament fiber materials that may be temperature cured to provide a rigid composite structure. Each half-length in a specific embodiment was made from Union Carbide's Thornel 300 graphite filament impregnated with Normco 5208 epoxy resin. The filamentary reinforcement was alined axially along a tapered mandrel by cutting tapered gores from a three-inch tape of the composite. An initial and a final circumferential tape layer was applied by winding strips of the same composite tape material around the mandrel circumference as reinforcement. The metallic end fittings (2024-T3 or 4 aluminum) at both the large and small ends of the cured half-lengths were bonded integral with the half-lengths during the cure procedure using a compatible, ductile film form epoxy adhesive such for example as Hysol EA 951. Half-lengths of up to nine feet were fabricated by this process to give column lengths of approximately eighteen feet. These specific half-lengths had a diameter of approximately four inches at the large end thereof and tapered to approximately two inches at the small tip end with uniform wall thicknesses in the range of 0.022 inch to 0.033 inch.

An optimum structural efficiency for the tapered columns was found to exist for a taper ratio of $r_1/r_2$ being approximately 0.41 where $r_1$ is the radius of the column at the small tip end and $r_2$ is the radius at the column center or large end of each half column. Columns having a wall thickness in the range of 0.022 to 0.033 inch, with 0.028 inch being preferred, have been built and tested.

Although one of the prime motivative forces leading to the tapered column concept of the present invention was for improved packing density, it was also discovered that the structural efficiency thereof was an improvement over that obtainable by cylindrical columns where the ratio of $r_1/r_2$ exceeds 0.15 and, at the optimum taper ratio of 0.41, a tapered column carries approximately thirty percent more load than an untapered column of the same weight.

The packing efficiency of the nested tapered half-length elements of the present invention over that achievable by cylindrical columns is vastly superior. For example, a sixty foot length constant diameter column having 0.028 inch wall thickness and designed to carry 1000 pound/ft load would have a diameter of 6.7 inches and only a 13,500 pound payload could be achieved in the cargo bay of the Space Shuttle as now anticipated as discussed hereinbefore. This is in contrast to a similar capability column that could be formed from 30 foot half-lengths having a diameter of 6.7 inches and nested (similar to the packaging of paper cups) for transport to permit a full 65,000 pound Shuttle payload. Individual half-lengths of these dimensions would weigh only approximately thirteen pounds with the aluminum end fittings and only approximately twelve pounds without the end fittings. For automatically deployable truss structures, built from similar elements, even more severe volume constraints would be imposed since structures cannot be packaged as efficiently as individual elements. Thus, it is readily seen that volume critical payloads can be easily avoided by using the tapered column construction of the present invention for transportation to a spatial environment assembly station.

Figure 3:
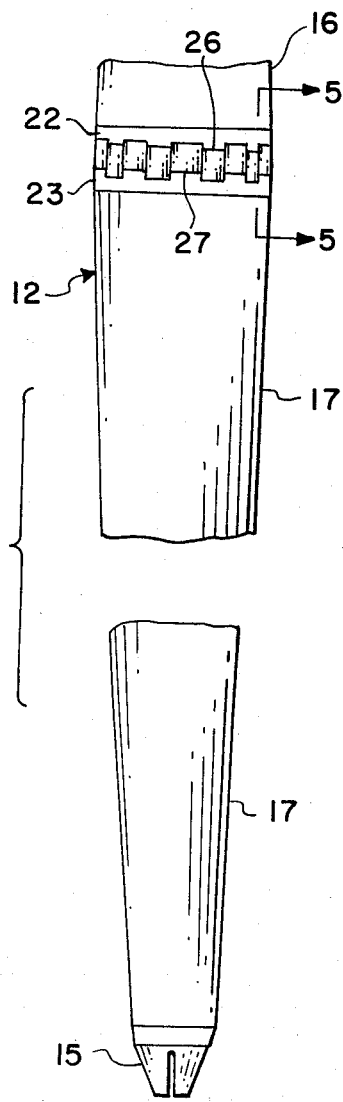
FIG. 3 is a view of two half-length segments connected together to form a column for use in the truss structure of FIG. 1.

Although structural requirements will vary between various space missions, any proposed truss structure should have as many identical elements as possible and the tetrahedral truss structure of FIG. 1 would be constructed from identical half-lengths and identical brackets. For different truss structures, brackets having different angular disposed arms may be necessary. The mass requirements for a tetrahedral truss using cylindrical columns in lieu of the tapered columns of the present invention have been calculated for various column lengths and it was shown that in using 100 ft tapered columns resulted in approximately a factor of ten reduction in the number of flights over that required for the deployable truss modules and approximately a factor of five over that for erectable cylindrical or constant diameter columns. Although the in-orbit assembly of either tapered or constant diameter columns in a truss structure presents logistic problems, the potential efficiencies of erecting nestable tapered columns in a truss-type configuration warrant the use thereof. By utilizing the half-length fittings of the present invention, only an axial motion of approximately 50 pound axial force is required to lock two half-lengths into a unitary column. This is well within the capability of manual or available automated equipment. Tests of the locked joint (FIG. 3) in tension to 1200 pounds have been conducted without failure. Tensile loads of this magnitude, as well as the compressive loads, are acceptable for the truss-type structure constructed according to the present invention.

Orbital assembly of large structures will be an arduous task requiring every effort be made to minimize construction difficulties. The angular-armed bracket 15 described herein is one simple way of interconnecting the various columns in a truss structure. These columns are slidably positioned, with the bifurcated tip thereof receiving the bracket arm, and suitable lock bolts, spring pins, screws or the like being positioned in the holes alined in the bracket arm and bifurcated tip.

In order to achieve maximum efficiency, establishment of a structural assembly site in low earth orbit is anticipated to minimize logistic and resupply requirements. It is anticipated that such site be multi-functional to provide the necessary quarters and life support for assembly technicians, to serve as a docking and storage facility for off-loading cargo of personnel and material from the Space Shuttle and to provide an assembly line for fabricating structural modules. These fabricated modules could be incorporated into larger structural assemblies for utilization at the low orbit or they could be transferred into higher orbit individually or combined with other structures for use in deep space applications.

Although the invention has been described relative to specific embodiments thereof, it is not so limited and the specific examples herein are for illustration of the principle only and are not intended to serve as limitations on applicant's invention. For example, the diameter, length and thicknesses of the specific half-length columns may be altered as desired and required for a specific mission or purpose. Also, the specific composite material employed for the high strength columns may be varied as can the materials employed in machining the end fittings and brackets for the half-length members. For example, other prepreg tapes that are suitable in practice of the present invention are commercially available from the 3-M Company, Hercules, Fiberite Company and others. Also, the end fittings and brackets need not be made of specific metals or alloys but could be formed from structural plastics, composites or the like and could, in some instances, be molded instead of machined. Additionally, instead of bonding the end fittings to the half-length structures, tight frictional fittings, suitable spring clips, bolts or the like may be used to join the half-length end fittings thereto.

It is also considered within the realm of the present invention to construct columns with more than two equal parts, for example, four, six, eight, etc., to achieve additional length structures. In this aspect of the invention, suitably designed and proportional intermediate column segments would be equipped with lock end fittings at both ends thereof to permit assembly of multiple equal numbered segments into a double tapered unitary column as described hereinbefore. The nestable column segments described herein are not limited to the solid cylindrical construction shown in the specific examples but may be formed with open or lattice-type skins and/or triangular, square, etc., cross-sectional areas rather than the circular area shown.

These and other modifications and variations of the specific embodiments described herein will be readily apparent to those skilled in the art in light of the above teachings. It is therefore to be understood that within the scope of the appended claims, the invention may be practiced otherwise than as specifically described herein.

What is claimed as new and desired to be secured by Letters Patent of the United States is:

1. A lightweight structural element adapted to be secured to a plurality of like members to form a truss structure comprising:
    an elongated hollow body having a first end and tapering along the body length to a second end;
    a first fitting secured to said first end and so constructed and arranged as to form engaging surfaces for attachment to an identical fitting secured to another identical structural element, and a second fitting secured to said second end and having an extension thereon to facilitate attachment of said second end to other elements;
    said first fitting being provided with a first length slidably received within said first end of said hollow body, a second length thereof integral with said first length and forming an annular shoulder exteriorly along the circumference of said hollow body, and a third length thereof integral with said first and said second lengths and forming a plurality of equal width fingers disposed in equal spaced adjacency along the circumference of said second length and wherein the spacing between any two individual fingers is at least as wide as an individual finger, and
    said elongated body being formed of a graphite/epoxy composite material.

2. The lightweight structural element of claim 1 wherein said plurality of equal width fingers are provided with tab protrusions at the ends thereof, said tab protrusions projecting perpendicularly inwardly toward the longitudinal center to provide a surface area for contacting an annular shoulder on a like structural element when two elements are forcibly connected by an axial force directed along the longitudinal axis thereof and the tips of said tab protrusions being provided with an inwardly tapered surface.

3. The lightweight structural element of claim 1 wherein the circumferential area of said second length disposed between said fingers is also provided with a tapered end surface and serving to engage the tapered surface tip of individual fingers on a like structural element to assist in springing the individual fingers over said second length for lock engagement with said annular shoulder thereon.

4. The lightweight structural element of claim 1 wherein said fingers have an inherent spring resiliency to permit attachment of said element to a like element by slidably positioning said fingers on a like element such that said fingers lock onto the annular shoulder on the like element.

5. A lightweight structural element adapted to be secured to a plurality of like members to form a truss structure comprising:
   an elongated hollow body having a first end and tapering along the body length to a second end,
   a first fitting secured to said first end and so constructed and arranged as to form engaging surfaces for attachment to an identical fitting secured to another identical structural element, and a second fitting secured to said second end and having an extension thereon to facilitate attachment of said second end to other elements,
   said second fitting being provided with a first length slidably received within said second end; a frustoconical portion integral with said first length and having an annular shoulder thereon adapted to abut against said second end; and, said extension being bifurcated and integral with and tapering away from said frustoconical portion to an essentially pointed tip, and
   said elongated hollow body being formed of a graphite/epoxy composite material.

6. The lightweight structural element of claim 5 wherein said bifurcated extension is provided with at least one diametrical opening therethrough and adapted to receive lock means for securing said element to a member receivable within the bifurcated extension.

7. A lightweight truss structure comprising in combination:
   a plurality of elongated structural columns interconnected to form the truss structure,
   each said column being formed of two hollow connected half-length segments and tapering from an enlarged center section to reduced diameter ends of essentially one-half the diameter of said center section,
   each said half-length segment being provided with identical sliding fit lock connecting elements extending therefrom at an enlarged end thereof to facilitate column construction from any two half-length segments,
   each said half-length segment being provided with second end fittings at the reduced diameter ends thereof to facilitate connection of these ends to other of said columns to thereby form a unitary lightweight truss structure.

8. The combination of claim 7 wherein each said second end fitting is provided with a bifurcated tip and rigid cluster bracket means having angular disposed exterior fingers thereon are securely positionable within said bifurcated tips to thereby connect a plurality of said columns for forming said truss structure.

* * * * *